United States Patent Office 2,892,098
Patented June 23, 1959

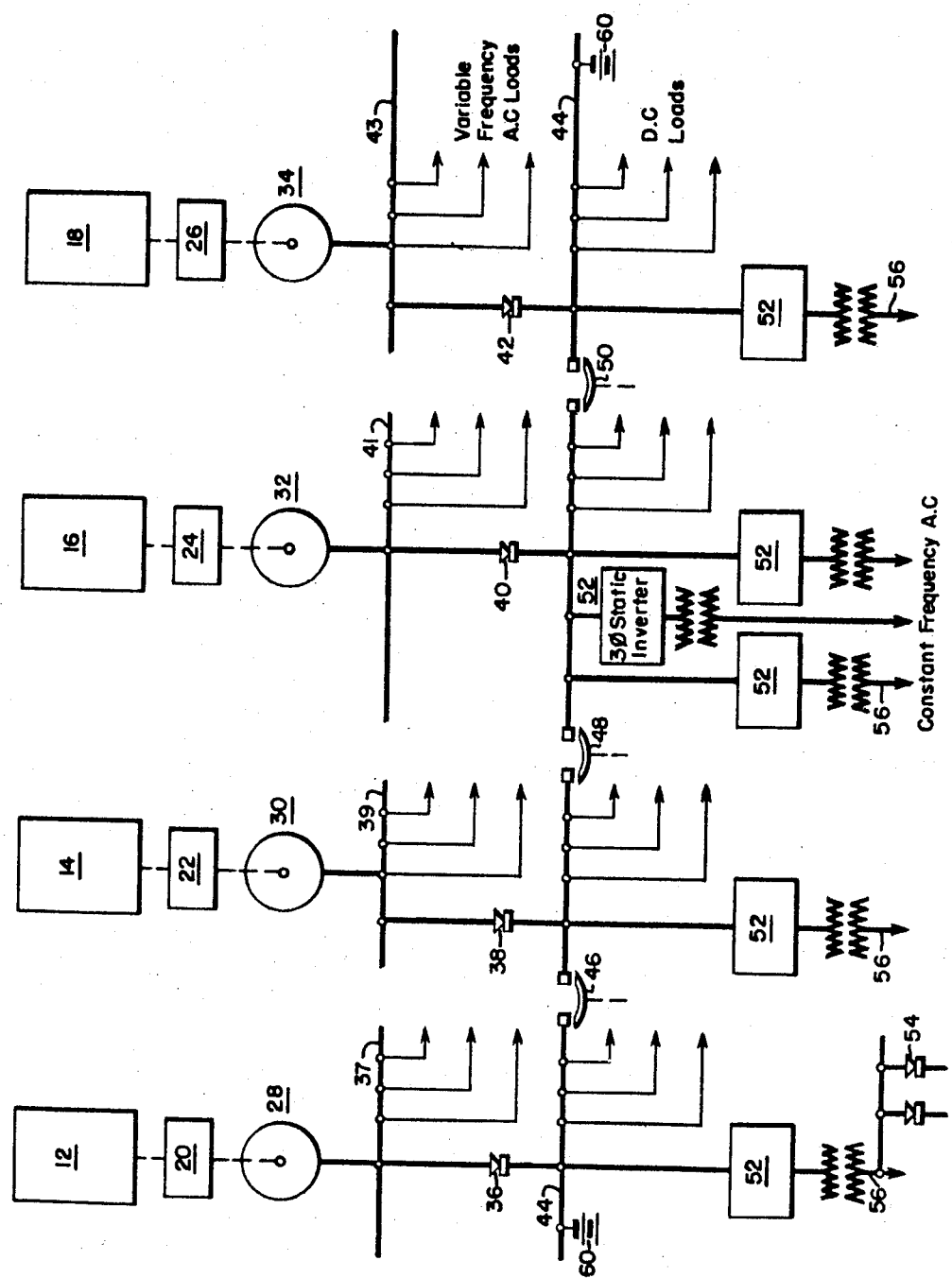

2,892,098

AIRCRAFT ELECTRICAL SYSTEM

Royal C. Bergvall, Forest Hills, Pa., assignor to Westinghouse Electric Corporation, East Pittsburgh, Pa., a corporation of Pennsylvania Application October 15, 1957, Serial No. 690,354

4 Claims. (Cl. 307—84)

This invention relates to electrical generating systems, and more particularly to novel means for providing direct current and constant frequency alternating current from a variable frequency alternating current source.

An important field of application of the invention is on large aircraft where it is necessary to have a plurality of polyphase alternating current generators each driven by a different one of a plurality of engines. However, the proposed generating system is also applicable to other systems including non-airborne applications, single generator systems, and to single phase as well as polyphase systems which require direct current and various frequencies of alternating current to be available.

In aircraft applications, weight and space requirements are important considerations in the design of an electrical generating system. In all applications, including aircraft, low cost, simplicity and reliability constitute primary objectives. Constant frequency main power generating systems requiring complicated hydromechanical constant speed generator drives are now in use in larger aircraft. Such systems are expensive, complex heavy, bulky and create difficult paralleling problems in multi-engine planes. Present aircraft designs are requiring increasing amounts of alternating current beyond that economically and reliably obtainable with present day inverters i.e. rotating and vibrating types. Much of the alternating current load can stand rather a wide range of frequency variation as long as the voltage is held within a reasonable range. Typical of such loads are heating equipment, lighting and motors operating bomb-bay doors, flap actuators, hydraulic pumps, and landing gear actuators. The speeds at which these motorized operations would take place will vary with frequency, but the loads can be selected to be of such a nature that this would be of minor consequence. Some motor loads and certain electronic loads, such as tube filaments and plate and grid power supplies would preferably be supplied from constant voltage direct current. Other loads require constant frequency alternating currents of varying frequencies, with some few requiring close frequency control.

The principal object of this invention is to provide constant frequency alternating current from a variable frequency alternating current generator geared directly to an engine.

Another object of this invention is to provide constant frequency alternating current and direct current from a variable frequency alternating current generator geared directly to an engine.

A further object of this invention is to provide variable frequency alternating current and paralleled direct current supplies operating simultaneously from the same alternating current generators.

A still further object of this invention is to provide variable frequency alternating current and paralleled direct current and constant frequency alternating current of any desired frequency operating simultaneously from the same variable frequency alternating current generator.

A still further and more specific object of the invention is to provide an electrical system for aircraft or other systems having one or more engines in which generators are driven directly by their respective engines, thereby generating variable frequency alternating current, which will simultaneously supply direct current and constant frequency alternating current of any desired frequency, utilizing semiconductor rectifiers and static inverters.

Other objects and advantages of the invention will be apparent from the following detailed description, taken in connection with the accompanying drawing, the single figure of which is a single line block diagram of the electrical generating system of this invention.

Engines 12, 14, 16, and 18 may be aircraft engines or other suitable prime movers. Gear boxes 20, 22, 24 and 26 are placed between their respective generators 28, 30, 32 and 34 and their respective engine shafts to give one or more gear shifts in order to maintain the generator speed within the acceptable limits. There may be any number of engine units. Any suitable type alternating current generator may be used in conjunction with each unit. It may be single phase or polyphase. In normal operation, the generators would preferably be geared directly to the engines which, in practice, are many times the rating of the generator and thus, would be subject to operating speed variations. Typical jet engines at minimum cruising power seldom get below 70% of their maximum engine speed and the frequency would vary accordingly. Since the frequency of the alternating current system is allowed to vary with the speed of the propulsion power plant, no complicated constant speed drive is needed. The complete alternating current generating system including an exciter, voltage regulator and generator circuit protective system is standard in every respect as are the alternating current load protection and changeover provisions.

Each alternating current generator has an additional load, viz. the direct current load supplied through the silicon rectifiers 36, 38, 40 and 42. Silicon rectifiers are suggested because they can withstand high temperatures that will be experienced in modern high speed aircraft. It will be understood, however, that any type of rectifier may be used, preferably of the semi-conductor type, such as selenium or germanium. The rectifier may be connected directly without transformers to the alternating current generator load bus or it may be connected through transformers if necessary. The usual load circuit protection provisions may be incorporated in the system but are omitted from the drawings for the purpose of simplicity and to avoid obscuring the invention.

The direct current output of the rectifier feeds the direct current bus 44 operating in parallel with one or more similar units. The generators will thus be paralleled on the direct current bus which will be independent of frequency variation and thus simplify the paralleling problem to techniques that are quite well known. As the rectifiers will only have about three to five percent loss, it will be preferable to regulate for a constant voltage on the direct current bus and let the alternating current voltage fluctuate correspondingly which is satisfactory for typical alternating current variable frequency loads. The direct current bus may be segregated by breakers 46, 48 and 50 so that in emergencies parallel operation could be omitted. Other paralleling arrangements common to the switching art may be used.

If the proper voltages were selected for both the alternating current generator and the direct current bus, then transformers normally associated with the rectifiers would not be necessary. However, if in practice, such voltages are not desirable, transformers could be used with the rectifiers at some increase in weight and losses.

The rectifiers 36, 38, 40 and 42 may be full-wave three-phase bridge rectifiers or three-phase half-wave bridge rectifiers. It will be obvious, of course, that if the generators 28, 30, 32 and 34 are single-phase generators, the bridges will be full-wave or half-wave single-phase rectifiers.

The variable frequency alternating current buses 37, 39, 41 and 43 supply as much variable frequency power as can stand the rather wide range of frequency variation as long as the voltage is held within approximately a 10% range. Typical loads would be heating, lighting, and motors operating bomb-bay doors, flap actuators, landing gear actuators, and hydraulic pumps. In emergencies, these loads could be shifted to another alternator without the necessity of paralleling the generators at their alternating current terminals.

The next most efficient place to supply power is from the direct current bus. Some motor loads would preferably be supplied from this bus and the constant voltage direct current could also be used to supply a part of the electronic load, such as tube filaments.

The constant voltage direct current bus would also be used as a reliable source of power for the transistorized switching circuits or static inverters 52 that produce alternating current at any selected frequency within, roughly, the audio range. These static devices can be made in either small or large powers to supply gyros and the specialized components of electronic gear.

Any suitable transistorized switching circuits that produce alternating current at any selected frequency may be utilized. An example of such a multiphase static inverter is described more fully in the copending patent application Serial No. 710,934, filed January 24, 1958, by R. P. Putkovich and T. M. Corry, and assigned to the assignee of the present invention. These static inverters 52 may be either single phase or multi-phase inverters. Loads which require a constant frequency alternating current of a selected frequency may be supplied from these static inverters. If desired, floating batteries 60 may be provided on the direct current bus.

In addition to D.C. power supplied by the main D.C. bus certain specialized requirements, such as plate and grid power supplies requiring high voltage direct current may be obtained by rectifying the constant frequency alternating current supplied by the static inverters 52. Rectifiers 54, which may be of any suitable material, are connected to the output 56 of the inverters 52 for this purpose.

Since engine idling speed is usually about one-third of the maximum speed there may be some difficulty in obtaining electric power during idling of the engine under ground testing and during landing operations. If large amounts of power are needed during engine idling, gear boxes 20, 22, 24 and 26 may be placed between their respective generators and their respective engine shafts to give one or more gear shifts in order to maintain the generator speed within the acceptable limits. This could either be a planetary type gearing that would be shifted by clamping the ring gear or it could be a torque converter type shaft. This shifting could be done either manually or, preferably, automatically. It might also be possible to build an automatic device that would hold the generator frequency to say ±10% within weight limits that would produce overbalancing savings in the electrical system weight. This device could be simpler than the present hydromechanical constant speed drive which endeavors to hold accurate frequency for paralleling purposes.

A unique generating system has been described that is applicable to both single and multiple engine airplanes and other non-airborne systems that require direct current and various frequencies of alternating current to be available. The system utilizes semiconductor rectifiers and a unique three-phase static inverter employing transistorized switching circuits. The system herein disclosed provides a greatly simplified electrical generating system resulting in a substantial reduction in cost and weight as well as a saving in space of the overall electrical system. It can economically supply power for various electrical devices used on aircraft. Loads which do not require constant frequency are supplied with an alternating current with variable frequency alternating current. The system provides a direct source of power and constant frequency alternating current sources of power which can provide constant frequency alternating current at any desired frequency by use of the unique transistorized static inverter. These in turn can be rectified for specialized high voltage D.C. requirements. A single-phase system similar to the three-phase system described equally falls within the scope of this invention.

Since numerous changes may be made in the above described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. An electrical generating system comprising a plurality of alternators, each alternator adapted to be driven by a variable speed prime mover, a semiconductor rectifier connected to each alternator load bus, a common direct current load bus, said rectifiers operating in parallel to supply said common direct current bus, a plurality of static inverters supplied by said direct current bus to provide sources of constant frequency alternating current and a gear shift between each of said alternators and a corresponding drive shaft of said prime mover to maintain the frequency of said alternators within a predetermined range.

2. An electrical generator system comprising a plurality of alternators, each of said alternators adapted to be driven by a variable speed prime mover, a rectifier connected to each alternator load bus, said rectifiers operating in parallel with each other to supply a common direct current load bus, a plurality of circuit breakers in the direct current load bus to selectively provide a separate bus asociated with each alternator, and a plurality of inverters supplied by said direct current bus to provide constant frequency alternating current.

3. An electrical generating system comprising a plurality of alternators, each alternator adapted to be driven by a variable speed prime mover, a semiconductor rectifier connected to each alternator load bus, a common direct current load bus, said rectifiers operating in parallel to supply said common direct current load bus, a plurality of circuit breakers in the direct current load bus to selectively provide a separate bus associated with each alternator, a plurality of static inverters supplied by said direct current load bus to provide sources of constant frequency alternating current, and a gear shift between each of said alternators and a corresponding drive shaft of said prime mover to maintain the frequency of said alternators above a predetermined value.

4. In an aircraft having a plurality of propulsion engines, a polyphase electrical generating system comprising a plurality of polyphase alternators, each alternator adapted to be driven by one of said propulsion engines at variable frequency, a semiconductor rectifier connected to each alternator load bus, a common direct current load bus, said rectifiers operating in parallel to supply said common direct current bus, a plurality of circuit breakers in said direct current load bus to selectively provide a separate bus associated with each alternator, a plurality of multi-phase static inverters supplied by said direct current bus to provide sources of constant frequency polyphase alternating current, and a gear shift between each of said alternators and a corresponding drive shaft of said prime mover to maintain the frequency of said alternators above a predetermined value.

References Cited in the file of this patent

UNITED STATES PATENTS

| | | |
|---|---|---|
| 1,946,678 | Flad | Feb. 13, 1934 |
| 2,240,262 | Homef | Apr. 29, 1941 |
| 2,523,090 | Boyer | Sept. 19, 1950 |
| 2,776,379 | Sargeant | Jan. 1, 1957 |

OTHER REFERENCES

Study of Transformerless Rectified Higher Voltage D.C. Aircraft Electrical System "Transactions of the AIEE," vol. 73, November 1954, pages 253–258, J. P. Dallas et al.

A Rectified A-C Electric System for Aircraft, T. M. Cobb, et al., "Electrical Engineering," volume 68, February 1949, pages 95–101.

An A-C Vehicle Generating System, Albert D. Gelchrist, "Electrical Engineering," volume 66, August 1947, pages 779–780.